March 18, 1958     A. ZUNICH     2,827,339
WHEEL-SHAFT BEARING
Filed April 12, 1955
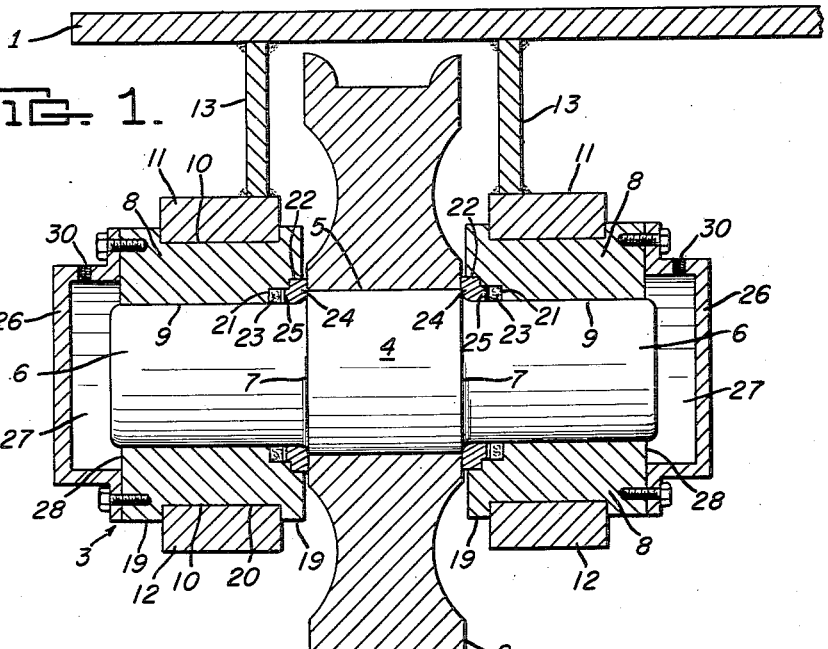
FIG. 1.
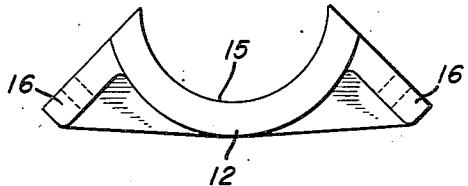
FIG. 3.
FIG. 4.
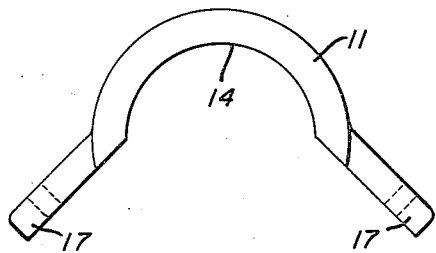
FIG. 2.
INVENTOR.
ANGELO ZUNICH,
BY: *Donald G. Dalton*
his Attorney

United States Patent Office 2,827,339
Patented Mar. 18, 1958

2,827,339

WHEEL-SHAFT BEARING

Angelo Zunich, Hobart, Ind.

Application April 12, 1955, Serial No. 500,793

5 Claims. (Cl. 308—18)

This invention relates, as indicated, to a wheel-shaft bearing and, more particularly, to a journal bearing assembly for mounting trolley wheels on a carriage support for the hoist mechanism of a traveling crane.

In traveling cranes, the hoist mechanism is supported on a trolley carriage which is customarily provided with roller bearing assemblies mounting it on trolley wheels for movement along a trolley track extending the length of the bridge structure. Due to the fact that the crane hoist mechanism is commonly used for the purpose of pulling stock sideways, the carriage is subjected to considerable end thrust of a nature which frequently results in failure of its roller bearing assemblies. Such failures are usually sudden and necessitate immediate replacement of the bearing assemblies. For this purpose, the common practice involves removal of the entire axle assembly from the carriage and its transfer to the machine shop for replacement of the damaged bearing assemblies. The crane of course is out of operation during the period of time required for bearing replacement.

One of the principal objects of this invention is to provide a wheel-shaft bearing for trolley-crane hoists which will eliminate the failures experienced with conventional roller bearing assemblies and the crane shutdown periods incident to their replacement.

A further object is to provide a trolley-crane carriage wheel bearing which may be replaced when needed by operations performed entirely on the bridge mounting the trolley crane carriage.

Another object is to provide a wheel-shaft bearing for trolley-crane hoist carriages which will have an increased life under similar conditions of operation as compared to the expected life of conventional roller bearing assemblies.

A still further object of the invention is to provide a wheel-shaft bearing for trolley-crane carriages which is comprised of a journal bearing having a housing formed of clamping parts for securing it to the crane carriage and which may be taken apart for replacement of the journal bearing without removing the wheel and axle assembly from the bridge of the crane on which the carriage is mounted.

Other objects and advantages will become apparent from the following description.

In the drawings there is shown a preferred embodiment of the invention. In this showing:

Figure 1 is a diametrical sectional view of the wheel shaft bearing of this invention showing its mounting on a crane hoist carriage, the carriage being shown fragmentarily;

Figure 2 is an end elevational view of the bearing assembly looking from the left of Figure 1, the trolley wheel being omitted;

Figure 3 is an end elevational view of a bearing housing or bracket forming a part of the mount for the bearing assembly shown in Figure 1; and Figure 4 is an end elevational view of a bearing cap or bracket clamp used in connection with the housing or bracket of Figure 3.

A portion of a trolley crane carriage is shown fragmentarily in Figure 1 wherein it is designated by the numeral 1. A trolley wheel 2 mounts the carriage 1 for movement along a track (not shown) extending the length of a crane bridge in accordance with conventional practice, the carriage 1 being provided with a supporting wheel assembly (not shown) at its other side. When the crane hoist mechanism (not shown) on the carriage 1 is used to drag stock sideways by movement of the bridge on which it is mounted, considerable thrust is applied laterally to the carriage 1 and its supporting wheels 2. The bearing assembly of this invention, designated as a whole by the numeral 3 and by which the carriage 1 is supported on the wheel 2, eliminates the failures experienced with conventional roller bearing assemblies due to end thrust and, in addition, facilitates assembly and repair as compared to the troublesome operations incident to the removal and repair of conventional roller bearing assemblies.

The wheel and bearing assembly 3 of this invention comprises an axle 4 having a center portion 5 on which the wheel 2 is keyed. The axle 4 has journals 6 extending outwardly from its center portion 5 which have a smaller diameter than the center portion 5 to provide outwardly facing shoulders 7 for a purpose to be described. Each journal 6 has a bearing 8 in the form of a solid bronze casting with a central opening providing a cylindrical bearing surface 9 in which the journal 6 is rotatably received. The outer surface of each bearing 8 has an annular groove 10 for receiving bearing mounting brackets 11 and 12 (see Figures 3 and 4). The brackets 11 form housings for the bearings and are rigidly secured as by welding to plates 13 constituting a part of the frame of the carriage 1 and which have semi-cylindrical recesses 14 in which a bearing 8 is received. Bearing caps in the form of clamping brackets 12 hold the bearings 8 engaged against the brackets 11, each bracket 12 having a semi-cylindrical recess 15 in which the bearing is received and flanges 16 for connection with similar flanges 17 on the bracket 11 by fastening bolts 18 as shown in Figure 2. The brackets 11 and 12 have a width corresponding to the width of the bearing groove 10 so that the shoulders 19 at the ends of the groove 10 are effective to limit axial movement of the bearing 8 with respect to the mounting brackets 11 and 12. The surfaces of the brackets 11 and 12 defining the recesses 14 and 15 have a shape corresponding to the contour of the base 20 of the bearing groove 10 and have clamping engagement therewith upon tightening of the fastening bolts 18.

At the inner end of the bearing surface 9 of each bearing 8, there is an enlargement of stepped configuration comprised of an inner groove 21 and an outer groove 22, the inner groove 21 having a lesser diameter than the diameter of the outer groove 22. An oil seal 23 is positioned in the inner groove 21 and a thrust ring 24 is positioned in the outer groove 22. Each thrust ring 24 bears against an axle shoulder 7 and is effective to transmit end thrust on the axle to the bearing 8. The thrust ring 24 has a rim 25 at its inner edge which projects into the groove 21 and is effective to hold the oil seal 23 therein.

An oil cap 26 is secured to the outer end of the bearing 8 and provides an oil reservoir 27 about the end of the journal 6 and an annular area 28 at the outer end of the bearing 8. A filling opening 30 is provided for filling the reservoir 27 with oil, a cap closure (not shown) being provided for the opening 30. Since the level of oil in the reservoir 27 will be above the bottom of the journal 6, an adequate supply of oil to the bearing surface 9 is insured at all times. Leakage of oil by movement inwardly over the bearing surface 9 is of course prevented by the oil seal 21.

Removal of the bearings 8 is accomplished readily by first removing the bearing cap 12 and then elevating the carriage to move the bracket 11 out of the bearing groove 10. The bearing 8 may then be removed from the axle by pulling it endwise with respect to the journal on which it is mounted. Replacement is of course effected by a reversal of these operations, all of which can be performed by unskilled mechanics on the crane bridge and without the necessity of taking the wheel assembly to a machine shop. In addition to facilitating repair and replacement, bearing assemblies 3 using the journal bearing 8 of this invention have been found effective to absorb end thrust without failure, the end thrust being transmitted through the bearing 8 to the housing brackets 11 and 12. The assembly 3 further has been found to have a life under normal operating conditions several times that which can be expected of conventional roller bearing assemblies.

While one embodiment of my invention has been shown and described it will be apparent that other adaptations and modifications may be made without departing from the scope of the following claims.

I claim:

1. In a trolley carriage, a wheel axle having a journal at an end thereof, a supporting member secured to said carriage, a bearing having an annular groove on its outer surface in which said supporting member is positioned and has supporting engagement with said outer surface, said bearing having a central opening providing a cylindrical bearing surface in which said journal is rotatably received, a bearing cap positioned in said groove and detachably connected with said supporting member for clamping said bearing in supporting engagement with said supporting member, and an oil cap secured to the outer end of said bearing and providing an oil reservoir about the outer end of said journal and an area on the outer end of said bearing.

2. The invention defined in claim 1 characterized by said bearing central opening having an enlargement at the inner end of said bearing with an oil seal in said enlargement.

3. In a trolley carriage, a wheel axle having a journal at an end thereof and an outwardly facing shoulder at the inner end of said journal, a supporting member secured to said carriage, a bearing having an annular groove on its outer surface in which said supporting member is positioned and has supporting engagement with said outer surface, a bearing cap positioned in said groove and detachably connected with said supporting member for clamping said bearing against said supporting member, said bearing having a central opening providing a cylindrical bearing surface in which said journal is rotatably received, and a thrust ring connected with the inner end of said bearing and engaged with said outwardly facing shoulder for transmitting end thrust on said axle through said bearing to said supporting member.

4. In a trolley carriage, a wheel axle having a journal at an end thereof and an outwardly facing shoulder at the inner end of said journal, a supporting member secured to said carriage, a bearing having an annular groove on its outer surface in which said supporting member is positioned and has supporting engagement with said outer surface, a bearing cap positioned in said groove and detachably connected with said supporting member for clamping said bearing against said supporting member, said bearing having a central opening providing a cylindrical bearing surface in which said journal is rotatably received, said opening having an enlargement of stepped configuration at the inner end thereof providing two grooves respectively of smaller and larger diameter, an oil cap secured to the outer end of said bearing and providing an oil reservoir about the outer end of said journal and an area on the outer end of said bearing, an oil seal in said enlargement groove of smaller diameter, and a thrust ring in said enlargement groove of larger diameter and engaged with said outwardly facing shoulder for transmitting thrust on said axle through said bearing to said supporting member and for holding said oil seal in position.

5. The invention defined in claim 4 characterized by said thrust ring having an outwardly projecting rim at its radially inner edge projecting into said enlargement groove of smaller diameter.

References Cited in the file of this patent

UNITED STATES PATENTS

| 465,204 | Rizzoni | Dec. 15, 1891 |
| 1,218,203 | Nelson | Mar. 6, 1917 |
| 1,514,234 | Severin | Nov. 4, 1924 |
| 1,709,461 | Cerva | Apr. 16, 1929 |

FOREIGN PATENTS

| 228,723 | Great Britain | Feb. 12, 1925 |